(12) United States Patent
Aneziris et al.

(10) Patent No.: US 9,221,718 B2
(45) Date of Patent: Dec. 29, 2015

(54) PRESSURE CASTING SLIP AND REFRACTORY CERAMIC PRODUCED THEREFROM FOR GAS TURBINE UNITS

(75) Inventors: Christos Aneziris, Freiberg (DE); Nora Gerlach, Freiberg (DE); Holger Grote, Mülheim (DE); Uwe Klippel, L'Isle D'Abeau (FR); Friederike Lange, Ratingen-Lintorf (DE); Stefan Schafföner, Freiberg (DE); Harm Speicher, Düsseldorf (DE)

(73) Assignee: SIEMENS AKTIENGESELLSCHAFT (DE)

( * ) Notice: Subject to any disclaimer, the term of this patent is extended or adjusted under 35 U.S.C. 154(b) by 0 days.

(21) Appl. No.: 14/239,032

(22) PCT Filed: Aug. 1, 2012

(86) PCT No.: PCT/EP2012/065002
§ 371 (c)(1),
(2), (4) Date: Mar. 26, 2014

(87) PCT Pub. No.: WO2013/023913
PCT Pub. Date: Feb. 21, 2013

(65) Prior Publication Data
US 2014/0228198 A1   Aug. 14, 2014

(30) Foreign Application Priority Data

Aug. 16, 2011  (EP) .................................. 11177668

(51) Int. Cl.
*C04B 38/00* (2006.01)
*C04B 35/63* (2006.01)
(Continued)

(52) U.S. Cl.
CPC ............... *C04B 35/63* (2013.01); *C04B 33/025* (2013.01); *C04B 33/22* (2013.01); *C04B 33/28* (2013.01);
(Continued)

(58) Field of Classification Search
CPC ............. C01P 2004/60; C01P 2004/61; C01P 2004/80; C01P 2004/82
USPC .................................... 501/80, 81, 82, 83, 84
See application file for complete search history.

(56) References Cited

U.S. PATENT DOCUMENTS 4,363,199 A * 12/1982 Kucheria et al. ............. 52/220.8
5,252,248 A * 10/1993 Edler et al. ............... 252/182.32

(Continued)

FOREIGN PATENT DOCUMENTS

| CN | 101014551 A | 8/2007 |
|---|---|---|
| DE | 1 299 546 B | 7/1969 |

(Continued)

OTHER PUBLICATIONS

International Search Report dated Mar. 26, 2013 issued in corresponding International patent application No. PCT/EP2012/065002.

(Continued)

*Primary Examiner* — Noah Wiese
(74) *Attorney, Agent, or Firm* — Ostrolenk Faber LLP

(57) ABSTRACT

A pressure casting slip for producing a refractory ceramic for use as a heat shield, e.g. in the hot gas path of gas turbine units, includes a particulate mixture of at least two materials having different coefficients of thermal expansion and also organic and/or inorganic binders and floating agents. The particulate mixture has a multimodal particle size distribution divided into 10-20 percent by weight of coarse particles in the size range 1-5 mm in diameter, 10-20 percent by weight of medium particles in the size range 0.5-1 mm in diameter and 60-80 percent by weight of fine particles in the size range up to 0.5 mm in diameter which together make up 100 percent by weight of the particle mixture.

7 Claims, 1 Drawing Sheet

(51) Int. Cl.

| | |
|---|---|
| C04B 33/02 | (2006.01) |
| C04B 33/22 | (2006.01) |
| C04B 33/28 | (2006.01) |
| C04B 35/04 | (2006.01) |
| C04B 35/057 | (2006.01) |
| C04B 35/06 | (2006.01) |
| C04B 35/10 | (2006.01) |
| C04B 35/12 | (2006.01) |
| C04B 35/18 | (2006.01) |
| C04B 35/185 | (2006.01) |
| C04B 35/443 | (2006.01) |
| C04B 35/447 | (2006.01) |
| C04B 35/46 | (2006.01) |
| C04B 35/48 | (2006.01) |
| C04B 35/50 | (2006.01) |
| C04B 35/505 | (2006.01) |
| C04B 35/528 | (2006.01) |
| C04B 35/565 | (2006.01) |
| C04B 35/636 | (2006.01) |
| F23M 5/00 | (2006.01) |
| F23R 3/00 | (2006.01) |

(52) U.S. Cl.
CPC ............... *C04B 35/04* (2013.01); *C04B 35/057* (2013.01); *C04B 35/06* (2013.01); *C04B 35/10* (2013.01); *C04B 35/12* (2013.01); *C04B 35/18* (2013.01); *C04B 35/185* (2013.01); *C04B 35/443* (2013.01); *C04B 35/447* (2013.01); *C04B 35/46* (2013.01); *C04B 35/48* (2013.01); *C04B 35/50* (2013.01); *C04B 35/505* (2013.01); *C04B 35/528* (2013.01); *C04B 35/565* (2013.01); *C04B 35/636* (2013.01); *C04B 35/6316* (2013.01); *C04B 38/007* (2013.01); *C04B 38/0074* (2013.01); *F23M 5/00* (2013.01); *F23R 3/007* (2013.01); *C04B 2235/3229* (2013.01); *C04B 2235/349* (2013.01); *C04B 2235/3427* (2013.01); *C04B 2235/5427* (2013.01); *C04B 2235/5472* (2013.01); *C04B 2235/6027* (2013.01); *C04B 2235/77* (2013.01); *F23M 2900/05004* (2013.01); *F23R 2900/00018* (2013.01)

(56) References Cited

U.S. PATENT DOCUMENTS

| | | | | |
|---|---|---|---|---|
| 5,407,703 | A | * | 4/1995 | de Jong et al. ................. 427/226 |
| 7,540,155 | B2 | | 6/2009 | Taut ................. 60/752 |
| 8,530,364 | B2 | | 9/2013 | Grote et al. ................... 501/105 |
| 2004/0050060 | A1 | | 3/2004 | Taut ................. 60/752 |
| 2008/0312064 | A1 | * | 12/2008 | His et al. .......... 501/84 |
| 2009/0069167 | A1 | | 3/2009 | Tardivat .......... 501/84 |
| 2011/0094423 | A1 | * | 4/2011 | DelloRusso, Jr. ............... 109/76 |
| 2011/0237420 | A1 | * | 9/2011 | Grote et al. ................... 501/104 |

FOREIGN PATENT DOCUMENTS

| | | |
|---|---|---|
| DE | 298 01 196 U1 | 3/1998 |
| DE | 197 45 232 C1 | 12/1998 |
| DE | 10 2008 011 820 A1 | 9/2009 |
| EP | 1 327 108 B1 | 5/2007 |
| EP | 2 138 474 A1 | 12/2009 |
| EP | 2 169 311 A1 | 3/2010 |
| JP | 1-282148 | 11/1989 |
| WO | WO/2010/034680 A * | 4/2010 ............... F23M 5/00 |

OTHER PUBLICATIONS

Search Report mailed Jan. 26, 2012 in corresponding European Application No. 11177668.8.
Uwe Klippel et al., "Shaped Coarse Grained Refractories by PressureSlip Casting," Advance Engineering Materials, vol. 13, No. 1-2, pp. 68-76, Feb. 1, 2011.
Almatis Premium Alumina: "Magnesium Aluminate Spinels," pp. 1-6, Mar. 12, 2009, Retrieved from the Internet: URL:http://www.almatis.com/download/data-sheets/GP-RCP__004__R07__0608.pdf (retrieved on Jan. 16, 2012).

* cited by examiner

PRESSURE CASTING SLIP AND REFRACTORY CERAMIC PRODUCED THEREFROM FOR GAS TURBINE UNITS

CROSS-REFERENCE TO RELATED APPLICATIONS

The present application is a 35 U.S.C. §§371 national phase conversion of PCT/EP2012/065002, filed Aug. 1, 2012, which claims priority of European Patent Application No. 11177668.8, filed Aug. 16, 2011, the contents of which are incorporated by reference herein. The PCT International Application was published in the German language.

FIELD OF THE INVENTION

The invention relates to a pressure casting slip for producing a refractory ceramic for use as heat shield in the hot gas path of gas turbine plants and also relates to a refractory ceramic for use as heat shield in the hot gas path of gas turbine plants.

BACKGROUND OF THE INVENTION

Gas turbine plants consist essentially of a compressor, a burner and a gas turbine. In the compressor, air which has been sucked in is compressed before it is mixed with fuel in a combustion chamber in the downstream burner arranged in the compressor plenum and this mixture is burnt. The gas turbine located downstream of the combustion chamber then withdraws thermal energy from the combustion offgases formed and converts this thermal energy into mechanical energy. A generator connected to the gas turbine converts this mechanical energy into electric energy to generate power.

Current gas turbine plants, like other power-generating plants, have to generate very low pollutant emissions combined with maximum efficiency in all load ranges. The magnitude of the combustion temperature is limited by legally prescribed NOx values. The temperature in the combustion chamber, which forms the hot gas path between the burner and the gas turbine, is typically in an order of magnitude of from about 1300 to 1500 degrees Celsius. To be able to withstand these high temperatures, appropriate combustion chamber linings against such hot gas attack therefore have to be provided in order to protect the components and support structures enclosing the hot gas path.

Such heat shields can be either metallic or ceramic. In the case of gas turbine plants, ceramic materials are preferred because of the aggressive hot gases. Compared to metallic materials, such refractory ceramics have a higher temperature resistance and corrosion resistance and also a lower thermal conductivity. The materials on which such ceramic heat shields are based are high-α-alumina refractory ceramics which are, for example, produced by the pressure casting slip casting process described in DE 10 2008 011 820 A1.

Gas turbine plants now have to be adapted to the prevailing load conditions in a very short time. The highest stresses on the components and support structures of the gas turbine plant, i.e. including the heat shields, arise on quickly shutting down from base load. In such a case, the hot gas temperature can drop in a very short time by up to about 1000 kelvin. The thermal shock induced thereby in the heat shields makes it necessary for the refractory ceramic to have material properties which make possible a high strength combined with high thermal conductivity and do this at temperatures of up to about 1500 degrees Celsius and more. In addition, the refractory ceramics are required to have a high resistance to crack formation. EP 1 327 108 A1 discloses refractory ceramics which satisfy the abovementioned properties; for this purpose, the refractory ceramic has on average a different particle size distribution on the particularly stressed hot gas side than on the opposite, cooler combustion chamber wall side. However, such a particle size distribution has the disadvantage that additional internal stresses can be induced at the interfaces of the different pore size distributions, which can have an adverse effect on the passive reliability of the heat shields. Ceramics having an optimized homogeneous particle size distribution have a positive effect on the passive reliability of the overall system.

SUMMARY OF THE INVENTION

It is an object of the invention to provide a pressure casting slip and a refractory ceramic produced therefrom which has a high thermal shock resistance and is therefore particularly suitable for use as a heat shield in the hot gas path of gas turbines.

This object is achieved by the pressure casting slip of the invention. The pressure casting slip comprises a particulate mix of at least two materials having different coefficients of thermal expansion and also organic and/or inorganic binders and floating agents. The multimodal particle size distribution of the mix is made up of 10-20 percent by weight of coarse particles in the diameter range 1-5 mm, 10-20 percent by weight of medium particles in the diameter range 0.5-1 mm and 60-80 percent by weight of fine particles in the diameter range up to 0.5 mm. The proportions of the weight distribution are selected so that they add up to 100 percent by weight of the particulate mix. This provides a total porosity of the refractory ceramic produced therefrom which is particularly preferred for use in gas turbine plants, together with a particularly high thermal shock resistance. Such refractory ceramics produced according to the invention thus have a behavior as materials which can reliably withstand the rapid thermal cycles arising in the case of quick shutdown or else generally during start-up and shutdown of the gas turbine plant.

The medium particle fraction itself preferably comprises at least 20 percent by weight of the material having the smaller coefficient of thermal expansion. This results in internal stresses arising in the microstructure during firing of the pressure casting slip and these lead to an increase in the strength of the refractory ceramic produced therefrom and thus to an improvement in the thermal shock behavior of the heat shield.

Xanthan, in particular xanthan in a concentration of not more than 0.05 percent by weight of the pressure casting slip, is preferably provided as binder and floating agent. The use of xanthan leads to stabilization of the multimodal particle size distribution in the pressure casting slip. This stability is necessary in order to achieve the desired uniform pore size distribution and thus a homogeneous porosity over the entire refractory ceramic produced therefrom, in particular in the case of complex heat shield geometries.

BRIEF DESCRIPTION OF THE DRAWING

The FIGURE schematically shows a scanning electron micrograph of an illustrative section through a refractory ceramic which has been produced according to the invention and is designed as a heat shield ceramic for use in gas turbine plants.

DESCRIPTION OF AN EMBODIMENT

The uniform distribution of the coarse, medium and fine particles, which extends homogeneously through the entire refractory ceramic and thus results in a desired virtually uniformly distributed porosity of about 18-20% over the entire ceramic, is indicated schematically in the sectional image in the drawing.

The setting of a very uniform porosity is influenced not inconsiderably by the binder used. If a siliceous binder or a combination of siliceous binders is provided as binder, a particularly readily modulatable pressure casting slip can be achieved. Unlike the cement-containing, phosphate-containing, aluminum hydroxide-containing binders known from DE 10 2008 011 820 A1, a siliceous binder binds only during sintering of the pressure casting slip. For this purpose, the flowable and pumpable pressure casting slip composed of the particle mix according to the invention, is comprised of oxides based on $Al_2O_3$, MgO, $MgAl_2O_4$, CaO, $ZrO_2$, $Cr_2O_3$, $CeO_2$, $Y_2O_3$, $TiO_2$, bauxite, andalusite, dolomite, chamotte, spinels, mullites and/or nonoxides based on SiC, C and/or raw materials containing this. The casting slip is mixed with an aqueous dispersion medium and the binder system. Kaolin or clay or bentonite or a combination of these three silicates is subsequently added as a siliceous binder system before the casting slip is then introduced under superatmospheric pressure into a casting mold which absorbs liquid or is permeable to liquid of a pressure casting plant in such a way that the molding composed of the particulate mix is formed on an interior surface of a casting space of the casting mold by removal of liquid present in the slip through the casting mold.

An alternative of a binder system composed of two polysaccharides as a binder results in a higher viscosity which is increased still further by dewatering in the casting mold by means of superatmospheric pressure or subatmospheric pressure, so that solidification of the pressure casting slip in the casting mold occurs. Here, binder systems composed of xanthan and guar bean flour solution, or alternatively based on xanthan, or carob seed flour, or carrageenan, or agar, or tragacanth, or karaya, or gum arabic or tarakem flour, or konjakmannan, or cassia gum, with any of them as a first polysaccharide and with a second polysaccharide are advantageously used. It has surprisingly been found that such binder systems display a greater dependence of the viscosity on the mixing ratio of dispersion medium/polysaccharides than a single polysaccharide mixed in the same amount with water. Even a slight reduction in the proportion of water in the water/polysaccharide mixture results in a large increase in the viscosity of the binder. As a result of the dewatering in the casting mold by means of superatmospheric pressure or subatmospheric pressure. The use of such a binder system brings about an increase in viscosity and crosslinking of the binder, so that solidification of the molding in the casting mold occurs.

The invention claimed is:

1. A pressure casting slip for producing a refractory ceramic for use as a heat shield in a hot gas path comprising:
    a particulate mix of at least two materials having different coefficients of thermal expansion and xanthan as an organic binder and floating agent, wherein
    the particulate mix has a multimodal particle size weight distribution of
    10-20 percent by weight of coarse particles in the diameter range 1-5 mm,
    10-20 percent by weight of medium particles in the diameter range 0.5-1 mm and
    60-80 percent by weight of fine particles in the diameter range up to 0.5 mm,
    proportions of the weight distribution are selected so that the weight distribution of the particles add up to 100 percent by weight of the particulate mix, and
    the medium particles comprise at least 20 percent by weight of the material having a smaller coefficient of thermal expansion.

2. The pressure casting slip as claimed in claim 1, wherein the xanthan is in a concentration of not more than 0.05 percent by weight of the pressure casting slip.

3. The pressure casting slip as claimed in claim 1, further comprising a binder system composed of a binder of two polysaccharides.

4. The pressure casting slip as claimed in claim 3, further comprising a binder system consisting of xanthan and guar bean flour solution.

5. A refractory ceramic for use as heat shield in the hot gas path of gas turbines, wherein the ceramic has been produced from the pressure casting slip as claimed in claim 1, the production being by drying and firing, and wherein the total refractory ceramic has a porosity of 18-20%.

6. The refractory ceramic as claimed in claim 5, wherein the ceramic comprises ceramic particles sizes in the pressure casting slip and which before drying and firing are distributed so that a refractory ceramic having a virtually uniform pore size distribution is formed.

7. A refractory ceramic for use as heat shield in the hot gas path of gas turbines, wherein the ceramic has been produced from the pressure casting slip as claimed in claim 1, wherein the ceramic comprises ceramic particle sizes in the pressure casting slip and which before drying and firing are distributed so that a refractory ceramic having a virtually uniform pore size distribution is formed.

* * * * *